US009977949B2

(12) United States Patent
Yuasa et al.

(10) Patent No.: US 9,977,949 B2
(45) Date of Patent: May 22, 2018

(54) IMPERSONATION DETECTOR

(71) Applicant: Kabushiki Kaisha Toshiba, Minato-ku (JP)

(72) Inventors: Mayumi Yuasa, Ota (JP); Ryuzo Okada, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 76 days.

(21) Appl. No.: 15/261,573

(22) Filed: Sep. 9, 2016

(65) Prior Publication Data
US 2017/0116745 A1   Apr. 27, 2017

(30) Foreign Application Priority Data

Oct. 27, 2015   (JP) ................. 2015-211089

(51) Int. Cl.
*G06K 9/00* (2006.01)
*G06K 9/62* (2006.01)
*G06T 5/00* (2006.01)

(52) U.S. Cl.
CPC ....... *G06K 9/00255* (2013.01); *G06K 9/6201* (2013.01); *G06T 5/001* (2013.01); *G06T 2207/10004* (2013.01); *G06T 2207/10028* (2013.01); *G06T 2207/20076* (2013.01); *G06T 2207/30201* (2013.01)

(58) Field of Classification Search
CPC combination set(s) only.
See application file for complete search history.

(56) References Cited

U.S. PATENT DOCUMENTS

| 6,738,516 | B1* | 5/2004 | Kondo | G06K 9/00255 382/154 |
| 7,974,446 | B2* | 7/2011 | Fujiwara | G06K 9/036 348/142 |
| 8,660,321 | B2 | 2/2014 | Hosoi | |
| 9,514,522 | B2* | 12/2016 | Fu | H04N 13/0022 |
| 9,697,609 | B2* | 7/2017 | Kim | G06T 7/75 |
| 9,799,118 | B2* | 10/2017 | Komatsu | G06T 7/593 |
| 2007/0253604 | A1 | 11/2007 | Inoue et al. | |
| 2008/0002866 | A1* | 1/2008 | Fujiwara | G06K 9/00255 382/118 |

(Continued)

FOREIGN PATENT DOCUMENTS

JP   2003-178306 A   6/2003
JP   2006-40151 A    2/2006
(Continued)

*Primary Examiner* — Anand Bhatnagar
(74) *Attorney, Agent, or Firm* — Oblon, McClelland, Maier & Neustadt, L.L.P.

(57) ABSTRACT

A detector in embodiments includes a processor. The processor acquires an image including a face of a person. The processor acquirer depth information of the face in the image from a distance measuring module. The processor sets a deficient area indicating an area where the depth information fails to be acquired. The processor detects the face area from the image. The processor acquires a reference image generated based on a probability set to the deficient area in the image, and calculates a degree of similarity between the face area where the deficient area is set and the reference image. The processor determines whether the image is impersonation based on the degree of similarity.

20 Claims, 5 Drawing Sheets

(56) References Cited

U.S. PATENT DOCUMENTS

| | | | |
|---|---|---|---|
| 2010/0085152 A1* | 4/2010 | Fukuda | G06K 9/00 340/5.82 |
| 2010/0158319 A1 | 6/2010 | Jung et al. | |
| 2010/0189313 A1* | 7/2010 | Prokoski | A61B 5/0064 382/118 |
| 2010/0195867 A1* | 8/2010 | Kipman | A63F 13/10 382/103 |
| 2010/0209006 A1* | 8/2010 | Grigsby | G06K 9/00 382/218 |
| 2012/0159290 A1* | 6/2012 | Pulsipher | G06K 9/00369 714/819 |
| 2014/0051515 A1* | 2/2014 | Geiss | A63F 13/04 463/31 |
| 2015/0139534 A1* | 5/2015 | Komatsu | G06T 7/0075 382/154 |
| 2017/0064305 A1* | 3/2017 | Fu | H04N 13/0022 |
| 2017/0068846 A1* | 3/2017 | Linguraru | G06K 9/00281 |
| 2017/0087415 A1* | 3/2017 | Nandimandalam | A63B 24/0075 |
| 2017/0124717 A1* | 5/2017 | Baruch | G06T 7/187 |

FOREIGN PATENT DOCUMENTS

| | | |
|---|---|---|
| JP | 2006-259931 A | 9/2006 |
| JP | 2007-164668 A | 6/2007 |
| JP | 2007-241402 A | 9/2007 |
| WO | WO 2010/058514 A1 | 5/2010 |

\* cited by examiner

INFRARED LIGHT IRRADIATION DEVICE

VISIBLE LIGHT CAMERA

INFRARED LIGHT RECEIVING CAMERA

HEAD OF TARGET PERSON

DISTRIBUTION IMAGE FOR PRESENCE/ABSENCE OF DISTANCE IMAGE

IMPERSONATION DETECTOR

CROSS-REFERENCE TO RELATED APPLICATIONS

This application is based upon and claims the benefit of priority from Japanese Patent Application No. 2015-211089, filed on Oct. 27, 2015; the entire contents of which are incorporated herein by reference.

FIELD

Embodiments described herein relate generally to an impersonation detector.

BACKGROUND

There has been a method for determining impersonation based on a distance difference from a camera in a face area or a distance difference to a background.

However, in the conventional technology described above, when there is an area where a distance from a camera fails to be acquired, a value of the area where the distance fails to be acquired is forcedly calculated, and a performance for detecting impersonation is deteriorated. When an action such as simple interpolation is taken, simple impersonation using cutting of a photograph, folding, and the like is hardly detected.

DETAILED DESCRIPTION

A detector in embodiments includes a processor. The processor acquires an image including a face of a person. The processor acquires depth information of the face in the image from a distance measuring module. The processor sets a deficient area indicating an area where the depth information fails to be acquired. The processor detects the face area from the image. The processor acquires a reference image generated based on a probability set to the deficient area in the image, and calculates a degree of similarity between the face area where the deficient area is set and the reference image. The processor determines whether the image is impersonation based on the degree of similarity.

Embodiments will now be described with reference to the accompanying drawings.

First Embodiment

Figure 1:
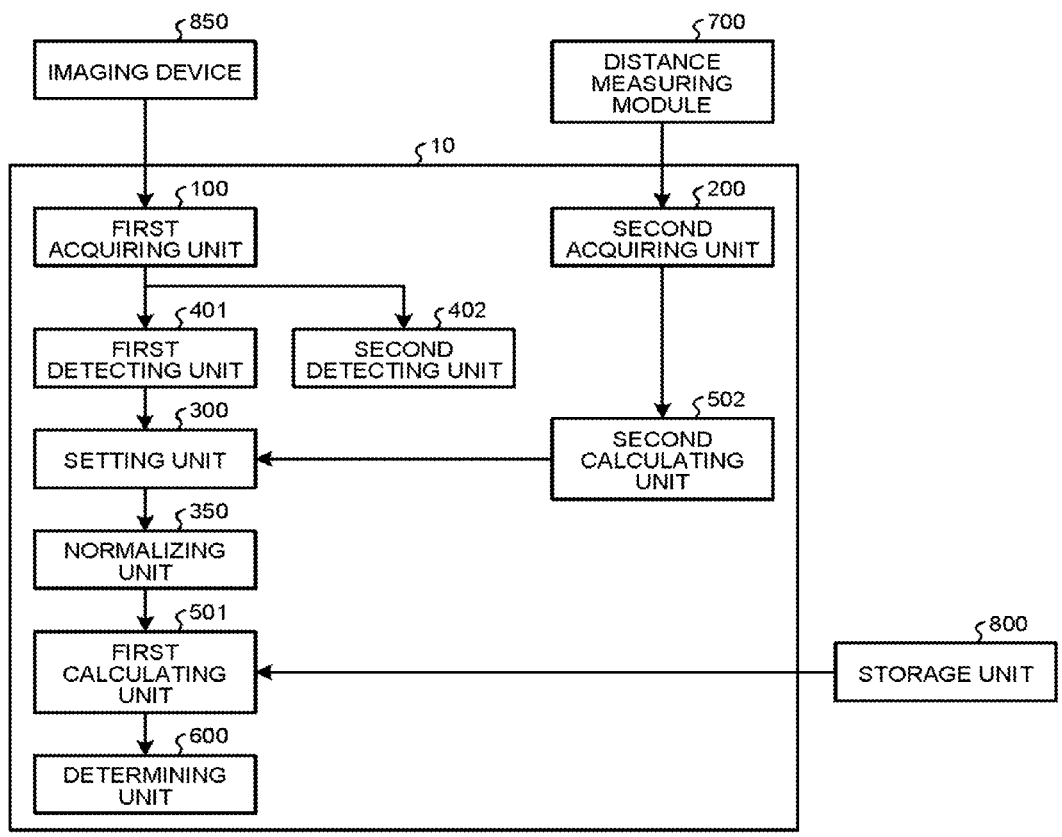
FIG. 1 is a configuration diagram illustrating an example of an impersonation detector according to a first embodiment.

FIG. 1 is a configuration diagram illustrating an example of an impersonation detector 10 according to a first embodiment. As illustrated in FIG. 1, the impersonation detector 10 includes a first acquiring unit 100, a second acquiring unit 200, a setting unit 300, a normalizing unit 350, a first detecting unit (face-area detecting unit) 401, a first calculating unit 501, a second calculating unit 502, a determining unit 600, a distance measuring module 700, a storage unit 800 and an imaging device.

The impersonation detector 10 can be implemented by, for example, a tablet terminal, a smartphone, or a personal computer (PC).

The storage unit 800 can be implemented by magnetically, optically, or electrically storable storage devices, for example, a hard disk drive (HDD), a solid state drive (SSD), a memory card, an optical disk, a random access memory (RAM), and a read only memory (ROM). The first acquiring unit 100 can be implemented by, for example, an imaging device 850 such as a camera, a communication device such as a network interface, and the storage devices described above. The first acquiring unit acquires an image imaged by the imaging device 850.

The face-area detecting unit 401 detects a face area of a person included in an image acquired by the first acquiring unit 100. Specifically, the following steps are performed.

In order to identify whether a face of a target person is photographed in an image, an attention area is set in the image. Subsequently, sets of rectangular areas made of a plurality of pixels are defined in the attention area.

Figure 2:
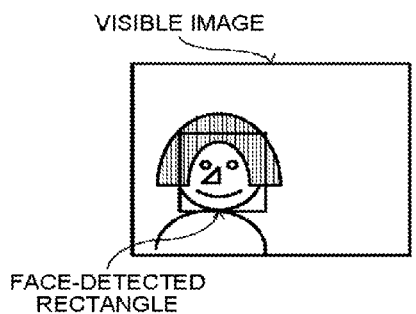
FIG. 2 is a diagram illustrating an example of a detected face area according to the first embodiment.

After that, a difference value in brightness of the sets of pixel areas, for example, a Haar-Like feature is calculated. It is identified whether a face is photographed in the attention area by comparing a threshold defined by pre-learning with a face image with the calculated difference value. The identifying method is not limited to this, for example, in order to evaluate correlation (co-occurrence) between a plurality of features, threshold processing of a plurality of brightness difference values (Joint Haar-like features) is combined so as to determine a face area with a higher accuracy. In addition, the attention area is determined while a position and size are changed in a face image so as to detect a position and size of a face area. An example of the detected face area is illustrated in FIG. 2. An example where a face is detected using a visible image is described, but if a face area is detected, a distance image, an infrared image, and the like may be used for detection.

The setting unit 300, the normalizing unit 350, the face-area detecting unit 401, the first calculating unit 501, and the determining unit 600 may be, for example, implemented by causing a processor such as a central processing unit (CPU) to execute a computer program, in other words, by software, implemented by hardware such as an integrated circuit (IC), and implemented by using software and hardware together.

Figure 3:
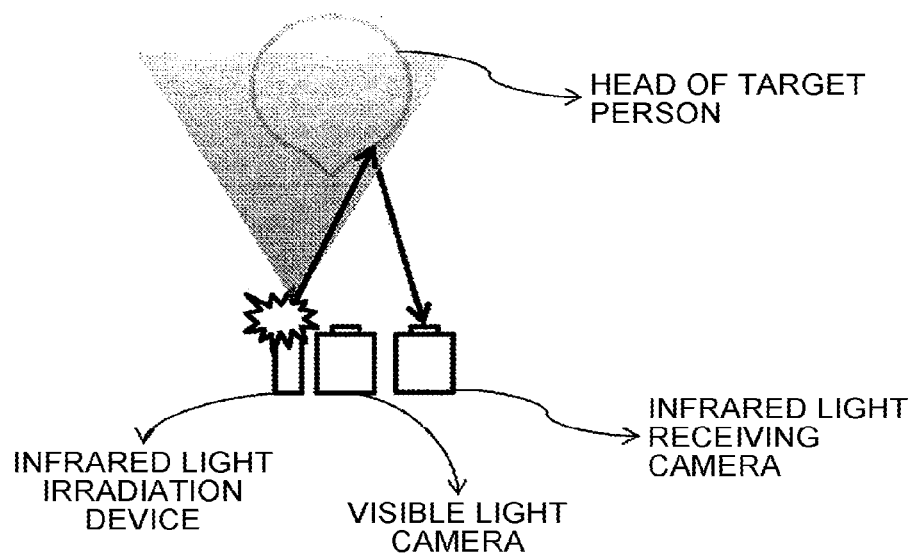
FIG. 3 is a diagram illustrating a distance measuring module according to the first embodiment.

The storage unit 800, stores therein a reference image generated based on a probability of occurrence of a deficient area indicating an area where depth information fails to be acquired. Details will be described later. The distance measuring module 700 measures a distance (depth information) from the distance measuring module 700 to a person that is an object to be imaged. Examples of the distance measuring module 700 include a three-dimensional distance image measuring device using a method for measuring a time when light with which a target person (subject) is irradiated hits the subject and returns (time of flight (TOF) method) and the like. The present embodiment describes a method (pattern irradiation method) for irradiating a subject with infrared pattern light, analyzing the pattern light reflected at the subject, and measuring a distance as illustrated in FIG. 3. The distance measuring module 900 is not limited to this, and may be a method for measuring a distance from a camera that uses a disparity by a stereo camera and generating a distance image. The second acquiring unit acquires depth information acquired by the distance measuring module 700 as well as the type of distance measuring module. The type of distance measuring module is classification such as the TOF method, the pattern irradiation method, and the stereo camera measurement. When a distance is calculated using a phase difference of irradiated patterns and when a grating pattern is used, more specific classification may be acquired compared to a case when a random pattern is used. It is better to acquire the type of distance measuring module because a probability as to whether a depth is acquired differs due to the classification difference.

Figure 4:
FIG. 4 is a diagram illustrating an example of a distance measurement result according to the first embodiment.

The setting unit 300 sets an area where depth information fails to be acquired from a distance image acquired by the second acquiring unit 200 as a deficient area. For example, an area where a light-receiving unit fails to detect light reflected from a subject is set as a deficient area. When information related to a distance corresponding to each position in an acquired distance image is equal to or less than a predetermined threshold, it may be determined that depth information fails to be acquired. When the type of the distance measuring module 800 is acquired in advance from the second acquiring unit 200 and information unmeasurable based on the type is separately given, information may be used. Similarly, when a threshold unmeasurable based on the type is determined in advance, the unmeasurable threshold may be used as a threshold. FIG. 4 illustrates the example. The normalizing unit 350 normalizes the deficient area set by the setting unit 300 using information on a face area detected by the face-area detecting unit 401, and generates a deficient probability image. In normalization, for example, using a position and size of a face area detected by face detection as a reference, a rectangular area illustrated in FIG. 4 is cut out as an image so that size of the rectangular area becomes a predetermined size. It is preferable that the predetermined size be the same as that of a reference image stored in the storage unit 700.

In the embodiment, a reference image is generated by averaging images acquired from a plurality of persons, but when use conditions are limited, an image acquired from only a using user may be used. When the user generates a reference image, the reference image may be changed for e registered user.

Figure 5:
FIG. 5 is a diagram illustrating an example of a deficient probability image according to the first embodiment.

A reference image may be used in which areas that are likely to be deficient in a face of a person, for example, an area where a normal direction has a certain angle or more from a front direction, an area such as pupils where specular reflection is likely to occur, and an area such as hair where light is likely to be absorbed are defined as deficient areas. FIG. 5 is an example of a deficient probability image generated in this manner. When depth information acquired from the second acquiring unit 200 is used, presence/absence of deficiency is binary. The normalizing unit 350 normalizes a deficient area so as to perform interpolation between pixels and the like, and a deficient, probability image becomes a multivalued image.

The first calculating unit 501 calculates a degree of similarity between a reference image from the storage unit and a deficient probability image generated by the normalizing unit 350. In the embodiment, when pixels in each of the images are regarded as one-dimensional vectors, an inner product value between them that is normalized with the number of pixels is defined as the degree of similarity. Furthermore, the second calculating unit 502 may calculate a representative distance (representative value) from distribution of distance images in a detected face area. An average value of distances of pixels that are in a face area and are not in a deficient area is calculated, and the calculated average value is defined as a representative distance. A reference image used for calculating a degree of similarity is selected from a plurality of deficient probability images preliminarily stored in the storage unit 800 depending on a calculated representative distance. In the embodiment, a deficient probability image is an image representing distribution of parts where a distance image fails to be acquired. It is good that a degree of similarity can be accurately calculated by selecting a deficient probability image using a representative distance even when a deficient area differs depending on a distance of a subject. An average value of distances in areas where a distance can be acquired in a face area is used as a representative distance, but the representative distance is not limited to this. A representative distance may be a value acquired from distribution in a face area. For example, a central value (median) and a most frequent value (mode) may be used.

The determining unit 600 determines that an image is not impersonation when the degree of similarity calculated by the first calculating unit 501 exceeds a predetermined threshold. By contrast, when the degree of similarity does not exceed the threshold, the determining unit 600 determines that an image is impersonation. Processing from the first acquiring unit to the determining unit may be repeated until a predetermined number of times or a predetermined time is exceeded, because the repetition of processing can avoid a situation where an acquired face image is deficient, a face is not appropriately detected, and the like when a whole area of a face of a target person is required. The determining unit 600 outputs a result as to whether an acquired image is impersonation.

As described above, according to the first embodiment, even when there is an area where depth information cannot be acquired, impersonation can be detected based on comparison with a reference image.

First Modification

In the first embodiment, the normalizing unit 350 performs normalization based on a face area detected by the face-area detecting unit 401, but may detect a direction of a subject to perform normalization based on the detected direction. An extracting unit 403 extracting an age and the like of a subject may be provided separately to switch reference images based on an attribute of the subject. Reference images may be switched depending on the type of the distance measuring module 700. Hereinafter, differences from the first embodiment are mainly described, and the same names and numerals as those of the first embodiment are assigned to components having the same functions as those of the first embodiment and explanation thereof is omitted.

Figure 6:
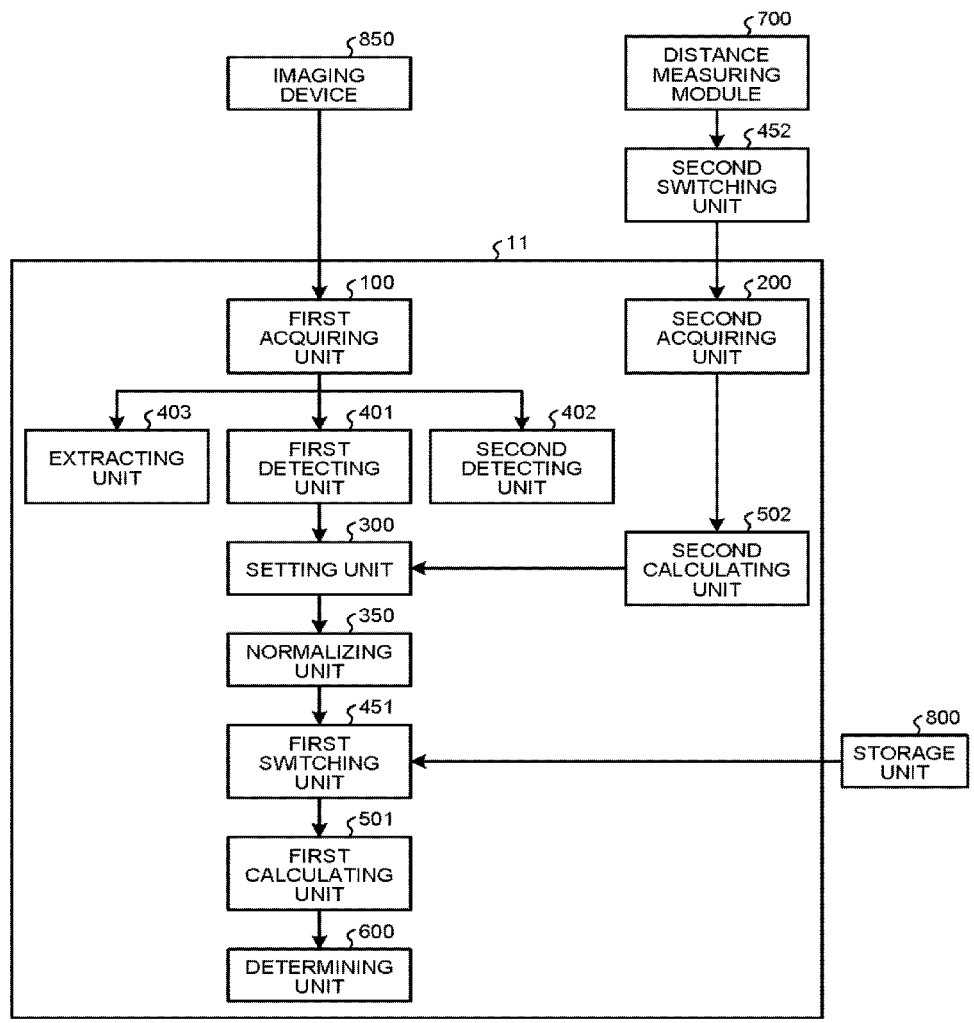
FIG. 6 is a diagram illustrating an example of an impersonation detector according to a first modification.

FIG. 6 is a configuration diagram illustrating an example of an impersonation detector 11 according to a first modification. As illustrated in FIG. 6, the impersonation detector 11 according to the first modification differs from that of the first embodiment in a second detecting unit (face-direction detecting unit) 402, the extracting unit 403, a first switching unit 451, and a second switching unit 452.

The face-direction detecting unit 402 extracts a face area in an image including a subject that is acquired by the first acquiring unit 100 and detects a direction of a face. As the direction of the face, for example, the face of the subject directed to a front face against an imaging device can be defined as 0 degree, and a side face directed to a right or a left direction against the imaging device 850 can be defined as 90 degrees. In such cases, the direction of the face may be estimated by learning an image photographed at a predetermined angle. The direction of the face may be estimated by preliminarily preparing a standard face model for the face of the subject, and detecting a difference between positions of for example, eyes, a nose, and a mouth. The face-direction detecting unit 402 may estimate the direction of the face and the normalizing unit 350 may perform normalization so that a target face area is directed to a front face. It is desirable that normalization enables the degree of similarity with a reference image to be calculated more accurately.

The normalizing unit 350 may perform normalization using only a face direction, but may further perform normalization using a size of a face area detected by the face-area detecting unit 401. For example, when a size of a reference image is a default and a direction is directed to a front face, normalization is preferably performed using the direction of the face and the size of the face area.

Using the direction of the face detected by the face-direction detecting unit 402, a range of a face direction on which impersonation detection processing is performed may be defined separately. More preferably, the same range may be defined as a face direction range that is most suitable at the time of performing authentication processing and the like following impersonation detection processing. The extracting unit 403 extracts attributes such as whether a subject is a male or a female (gender difference) and whether a subject is a child or an adult (age) from a face detected by the face-area detecting unit 401.

The first switching unit 451 switches to, based on an attribute extracted by the extracting unit 403, a reference image having the same attribute from the storage unit 800. When there is a plurality of attributes, for example, when the subject is an adult and a male, a reference image having these attributes is preferably selected. It is desirable that the degree of similarity can be more accurately calculated by combining this processing with normalization of the face area or the face direction.

Furthermore, the second switching unit 452 may switch reference images based on classification of the distance measuring module 700 acquired by the second acquiring unit 200.

For example, when the distance measuring module 700 in the TOF method is used, the subject is irradiated with infrared light, phases of which are aligned, from a light source. Subsequently, the light-receiving unit receives light reflected from the subject, and measures a distance to the subject based on a phase difference from the time of irradiation. A second acquiring unit may switch to, using classification of distance measurement in the TOF method, a reference image having the same classification in the TOE method from the storage unit 800. When there is a plurality of distance measuring modules 700, reference deficient probability images are stored in the storage unit 800 depending on respective types of the distance measuring modules 700, and may be switched depending on the type of a used distance measuring module.

Second Embodiment

A second embodiment differs from the first embodiment in that the first acquiring unit acquires a plurality of images imaged from different viewpoint positions. Hereinafter, differences from the first embodiment are mainly described, and the same names and numerals as those of the first embodiment are assigned to components having the same functions as those of the first embodiment and explanation thereof is omitted.

Figure 7:
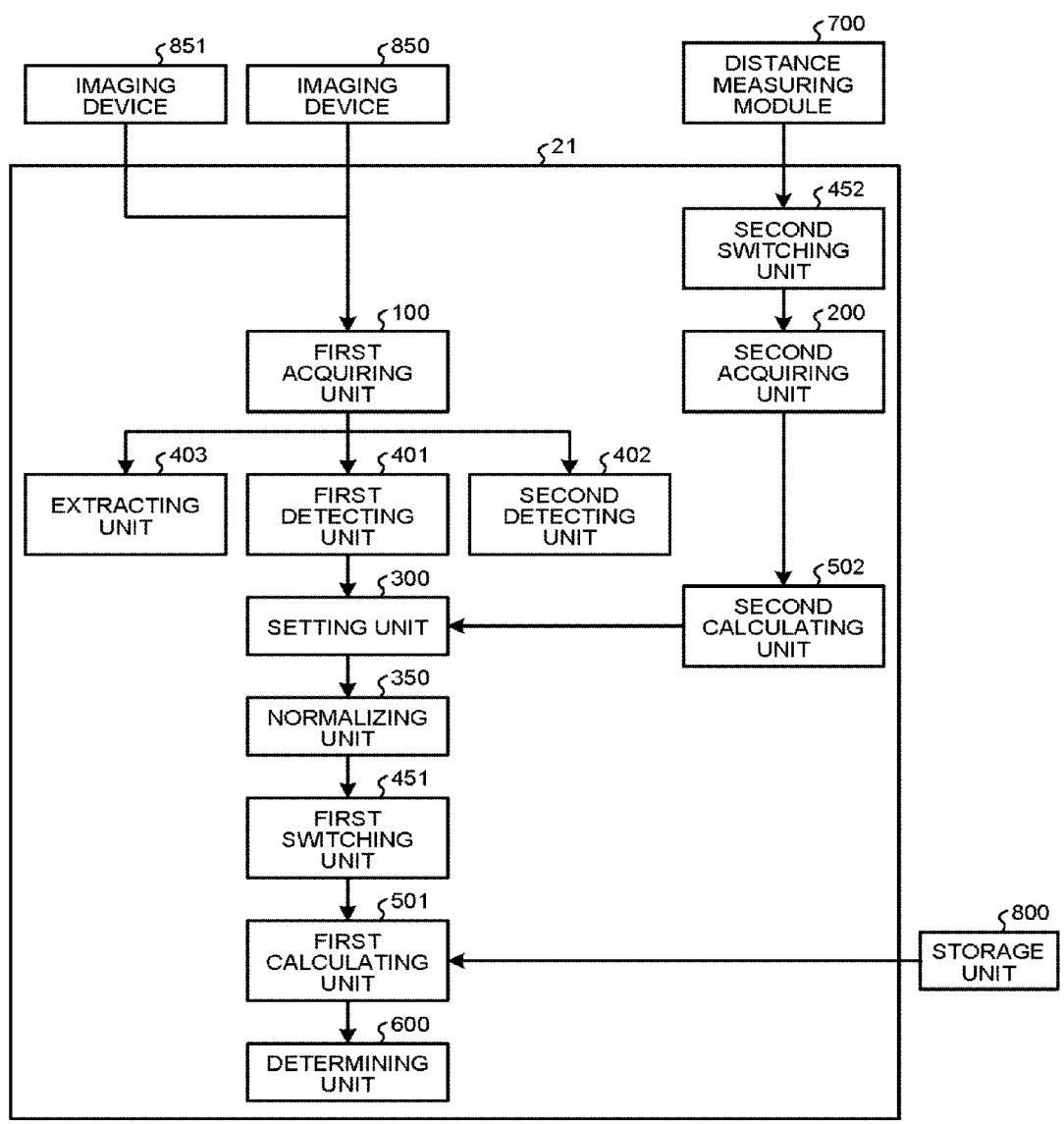
FIG. 7 is a configuration diagram illustrating an example of an impersonation detector according to a second embodiment.

FIG. 7 is a configuration diagram illustrating an example of an impersonation detector 21 according to the second embodiment. As illustrated in FIG. 7, a plurality of imaging devices 850 and 851 image a plurality of images. The first acquiring unit 100 acquires the images.

The face-area detecting unit 401 detects a face area of a person included in the images acquired by the first acquiring unit 100.

The setting unit 300 associates areas where a face is detected, and sets an area where the association is failed as a deficient, area.

The normalizing unit 350 normalizes the deficient area set by the setting unit 300 using information on the face area detected by the face-area detecting unit 401, and generates a deficient probability image.

The first calculating unit calculates the degree of similarity between a reference image from the storage unit and the deficient probability image generated by the normalizing unit 350.

The determining unit 600 determines that an image is not impersonation when the degree of similarity calculated by the first calculating unit 501 exceeds a predetermined threshold. By contrast, when the degree of similarity does not exceed the threshold, the determining unit 600 determines that an image is impersonation.

When a mutual position relation between the imaging devices 850 and 851 is known, a distance of the corresponding face area can be calculated using the principle of triangulation. In this case, the first acquiring unit 100 may acquire the distance from the imaging devices 850 and 851 as depth information. The setting unit 300 may set a pixel position having a distance within a predetermined threshold as a deficient area.

As described above, according to the second embodiment, the deficient area can be set using a plurality of imaging devices, and even when there is no distance measuring module, impersonation can be detected based on comparison with a reference image, similarly to the case where the depth information fails to be acquired.

The example where a plurality of imaging devices are used is described, but when changing a direction of an imaging device to a subject is possible, imaging may be performed with the direction changed after a specific time passes to set the deficient area using the imaging.

In the first embodiment and the first modification, deficient probability image can be generated by normalizing values measured at a plurality of times and performing statistical processing such as averaging of the values.

The example where a normalized deficient probability image and a reference image use multivalued images is described, but the deficient probability image and the reference image may be binarized by a predetermined value and may be binary from the beginning. When both are binary, it is desirable that the degree of similarity can be calculated at a high speed by bit operation.

In the second embodiment, the same modification as that of the first modification of the first embodiment may be made.

Hardware Configuration

Figure 8:
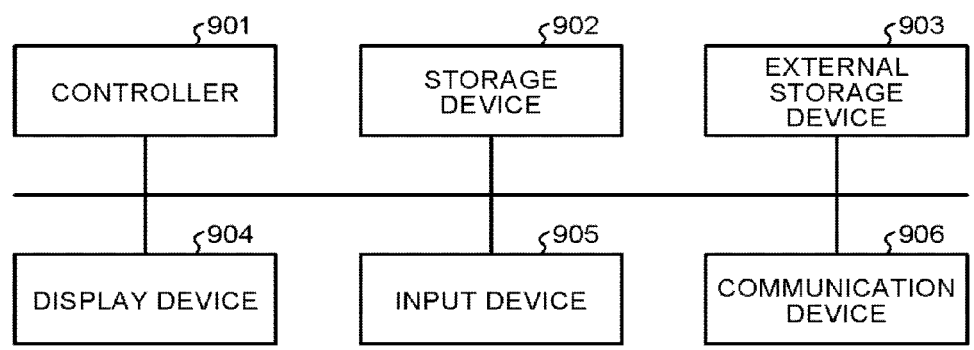
FIG. 8 is a configuration diagram illustrating an example of the impersonation detector according to the embodiments and the modification.

FIG. 8 is a diagram illustrating an example of the hardware configuration of the impersonation detector according to the embodiments and the modification. The impersonation detector in the embodiments and the modification includes a controller 901 such as a CPU, a storage device 902 such as a ROM and a RAM, an external storage device 903 such as an HDD, a display device 904 such as a display, an input device 905 such as a keyboard and a mouse, and a communication device 906 such as a communication interface, and has a hardware configuration using an ordinary computer.

A computer program executed by the impersonation detector according to the embodiments and the modification is a file in an installable format or in an executable format, and may be recorded and provided in computer-readable recording media such as a compact disc read only memory (CD-ROM), a compact disc recordable (CD-R), a memory card, a digital versatile disc (DVD), and a flexible disk (FD).

The computer program executed by the impersonation detector according to the embodiments and the modification may be stored in a computer connected to a network such as the Internet and be downloaded through the network so as to be provided. The computer program executed by the impersonation detector according to each embodiment and each modification may be provided or distributed through a network such as the Internet. The computer program executed by the impersonation detector according to each embodiment and each modification may be preliminarily incorporated in a ROM and the like so as to be provided.

The computer program executed by the impersonation detector according to the embodiments and the modification has a module configuration for implementing the above-mentioned units on a computer. As actual hardware, the CPU loads the computer program on the RAM from the HDD and executes the computer program so as to implement the above-mentioned units on the computer.

As described above, according to the embodiments and the modification, even when there is an area where depth information cannot be acquired, impersonation can be detected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit, of the inventions. The accompanying claims and their equivalents are intended to cover such forms or modifications as would fall within the scope and spirit of the inventions.

What is claimed is:

1. An impersonation detector comprising:
a memory; and
a processor coupled to the memory and configured
acquire an image including a face of a person;
acquire depth information of the face in the image from a distance measuring module;
set a deficient area indicating an area where the depth information fails to be acquired;
detect a face area from the image;
acquire a reference image generated based on a probability set to the deficient area in the image, and calculate a degree of similarity between the face area where the deficient area is set and the reference image; and
determine whether the image is impersonation based on the degree of similarity.

2. The impersonation detector according to claim 1, wherein the processor further configured to normalize a deficient area based on a size of the face area.

3. The impersonation detector according to claim 1, wherein the processor further configured to
detect a direction of the face in the image; and
normalize a deficient area based on a direction of the face.

4. The impersonation detector according to claim 1, wherein the processor further configured to
detect a direction of the face in the image; and
normalize a deficient area based on a size of the face and a direction of the face.

5. The impersonation detector according to claim 1, wherein the processor further configured to
calculate a representative value in the face area from the depth information; and
switch the reference image depending on the representative value.

6. The impersonation detector according to claim 1, wherein the processor further configured to
extract an attribute of the person included in the image; and
switch the reference image depending on the attribute.

7. The impersonation detector according to claim 1, wherein the processor further configured to
switch the reference image,
acquire a type of the distance measuring module, and
switch the reference image depending on the type of the distance measuring module.

8. The impersonation detector according to claim 1, wherein the distance measuring module includes a pattern light irradiation module and a pattern light receiving module.

9. The impersonation detector according to claim 8, wherein the processor further configured to set, as a deficient area, an area that the pattern light receiving module fails to receive.

10. The impersonation detector according to claim 1, further comprising a storage that stores therein the reference image.

11. An impersonation detector comprising:
a memory; and
a processor coupled to the memory and configured to:
acquire a plurality of images imaged from different viewpoint positions and including a face of a person;
detect the face areas from the images;
associate the detected face areas;
set a deficient area indicating an area that fails to be associated in the face areas;
acquire a reference image generated based on a probability set to the deficient area in the images, and calculates a degree of similarity between the face area where the deficient area is set and the reference image; and
determine whether the images are impersonation based on the degree of similarity.

12. The impersonation detector according to claim 11, wherein the processor further configured to normalize the deficient area based on a size of the face areas.

13. The impersonation detector according to claim 11, wherein the processor further configured to
detect a direction of the face in the images; and
normalize the deficient area based on the direction of the face.

14. The impersonation detector according to claim 11, wherein the processor further configured to
   detect a direction of the face in the images; and
   normalize the deficient area based on the size of the face and the direction of the face.

15. The impersonation detector according to claim 11, wherein the processor further configured to
   calculate a representative value in the face areas from the depth information; and
   switch the reference image depending on t representative value.

16. The impersonation detector according to claim 11, wherein the processor further configured to
   extract an attribute of the person included in the image; and
   switch the reference image depending on the attribute.

17. The impersonation detector according to claim 11, further comprising a storage that stores therein the reference image.

18. The impersonation detector according to claim 11, further comprising a distance measuring module.

19. An impersonation detecting method comprising:
   acquiring an image including a face of a person;
   acquiring depth information of the face in the image from a distance measuring module;
   setting a deficient area indicating an area where the depth information fails to be acquired;
   detecting a face area from the image;
   acquiring a reference image generated based on a probability set to the deficient area in the image, and calculates a degree of similarity between the face area where the deficient area is set and the reference image; and
   determining whether the image is impersonation based on the degree of similarity.

20. The impersonation detecting method according to claim 19, further comprising:
   normalizing a deficient area based on a size of the face area.

* * * * *